US008489864B2

(12) United States Patent
Sheaffer et al.

(10) Patent No.: US 8,489,864 B2
(45) Date of Patent: Jul. 16, 2013

(54) PERFORMING ESCAPE ACTIONS IN TRANSACTIONS

(75) Inventors: Gad Sheaffer, Haifa (IL); Jan Gray, Bellevue, WA (US); Martin Taillefer, Redmond, WA (US); Ali-Reza Adl-Tabatabai, San Jose, CA (US); Bratin Saha, Santa Clara, VA (US); Vadim Bassin, Raanana (IL); Robert Y. Geva, Cupertino, CA (US); David Callahan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 665 days.

(21) Appl. No.: 12/493,167

(22) Filed: Jun. 26, 2009

(65) Prior Publication Data
US 2010/0332807 A1    Dec. 30, 2010

(51) Int. Cl.
G06F 15/00   (2006.01)
G06F 7/38    (2006.01)
G06F 9/00    (2006.01)
G06F 9/44    (2006.01)

(52) U.S. Cl.
USPC .......................................... 712/220; 712/228

(58) Field of Classification Search
None
See application file for complete search history.

(56) References Cited

U.S. PATENT DOCUMENTS

| | | |
|---|---|---|
| 4,442,487 A | 4/1984 | Fletcher |
| 5,394,555 A | 2/1995 | Hunter |
| 5,404,555 A | 4/1995 | Liu |
| 5,428,761 A | 6/1995 | Herlihy et al. |
| 5,768,500 A | 6/1998 | Agrawal |
| 5,835,764 A | 11/1998 | Platt |
| 6,314,563 B1 | 11/2001 | Agensen |
| 6,665,704 B1 | 12/2003 | Singh |
| 6,751,617 B1 | 6/2004 | Anfindsen |
| 6,842,830 B2 | 1/2005 | Khare |
| 6,845,430 B2 | 1/2005 | Hopeman |
| 6,862,635 B1 | 3/2005 | Alverson |
| 6,871,264 B2 | 3/2005 | Soltis |
| 6,898,609 B2 | 5/2005 | Kerwin |
| 6,938,128 B1 | 8/2005 | Kuskin et al. |
| 6,976,155 B2 | 12/2005 | Drysdale |
| 7,111,294 B2 | 9/2006 | Steensgaard |
| 7,127,561 B2 | 10/2006 | Hill |
| 7,162,512 B1 | 1/2007 | Amit |
| 7,181,578 B1 | 2/2007 | Guha |

(Continued)

OTHER PUBLICATIONS

Zilles et al. (Extending Hardware Transactional Memory to Support Non-busy Waiting and Non-transactional Actions, Nov. 2006, pp. 1-10).*

(Continued)

*Primary Examiner* — Andrew Caldwell
*Assistant Examiner* — George Giroux
(74) *Attorney, Agent, or Firm* — Workman Nydegger

(57) ABSTRACT

Performing non-transactional escape actions within a hardware based transactional memory system. A method includes at a hardware thread on a processor beginning a hardware based transaction for the thread. Without committing or aborting the transaction, the method further includes suspending the hardware based transaction and performing one or more operations for the thread, non-transactionally and not affected by: transaction monitoring and buffering for the transaction, an abort for the transaction, or a commit for the transaction. After performing one or more operations for the thread, non-transactionally, the method further includes resuming the transaction and performing additional operations transactionally. After performing the additional operations, the method further includes either committing or aborting the transaction.

20 Claims, 4 Drawing Sheets

U.S. PATENT DOCUMENTS

| | | |
|---|---|---|
| 7,210,145 B2 | 4/2007 | Srinivasan |
| 7,213,106 B1 | 5/2007 | Koster |
| 7,246,123 B2 | 7/2007 | Carr |
| 7,320,065 B2 | 1/2008 | Gosior |
| 7,343,476 B2 | 3/2008 | Floyd et al. |
| 7,376,800 B1 | 5/2008 | Choquette |
| 7,395,382 B1 | 7/2008 | Moir |
| 7,406,698 B2 | 7/2008 | Richardson |
| 7,467,323 B2 | 12/2008 | Fields |
| 7,478,210 B2 | 1/2009 | Saha |
| 7,502,897 B2 | 3/2009 | Hertzberg |
| 7,512,636 B2 | 3/2009 | Verma |
| 7,516,366 B2 | 4/2009 | Lev |
| 7,584,232 B2 | 9/2009 | Guo |
| 7,711,909 B1 | 5/2010 | Lev et al. |
| 7,856,537 B2 | 12/2010 | Kumar et al. |
| 7,860,847 B2 | 12/2010 | Detlefs et al. |
| 8,095,824 B2 | 1/2012 | Gray |
| 8,229,907 B2 | 7/2012 | Gray et al. |
| 2003/0188300 A1 | 10/2003 | Patrudu |
| 2004/0243868 A1 | 12/2004 | Toll et al. |
| 2005/0060495 A1 | 3/2005 | Pistoulet |
| 2005/0246487 A1 | 11/2005 | Ergan |
| 2006/0085591 A1 | 4/2006 | Kumar |
| 2007/0143287 A1 | 6/2007 | Adi-Tabatabai |
| 2007/0143741 A1 | 6/2007 | Harris |
| 2007/0156780 A1 | 7/2007 | Saha |
| 2007/0156994 A1 | 7/2007 | Akkary |
| 2007/0186056 A1 | 8/2007 | Saha et al. |
| 2007/0198792 A1 | 8/2007 | Dice |
| 2007/0198979 A1 | 8/2007 | Dice |
| 2007/0239943 A1 | 10/2007 | Dice |
| 2007/0245099 A1 | 10/2007 | Gray |
| 2007/0245128 A1 | 10/2007 | Gray |
| 2007/0260608 A1 | 11/2007 | Hertzberg |
| 2007/0260942 A1* | 11/2007 | Rajwar et al. ............... 714/54 |
| 2008/0021934 A1 | 1/2008 | Hudson |
| 2008/0040551 A1 | 2/2008 | Gray |
| 2008/0127035 A1 | 5/2008 | Lev |
| 2008/0162886 A1 | 7/2008 | Saha |
| 2008/0163220 A1 | 7/2008 | Wang |
| 2008/0270745 A1 | 10/2008 | Saha |
| 2009/0006407 A1 | 1/2009 | Magruder |
| 2009/0006467 A1 | 1/2009 | Visscher |
| 2009/0006751 A1 | 1/2009 | Taillefer |
| 2009/0006767 A1 | 1/2009 | Saha |
| 2009/0007119 A1 | 1/2009 | Blumrich |
| 2009/0019231 A1 | 1/2009 | Cypher |
| 2009/0063780 A1 | 3/2009 | Terechko |
| 2009/0089520 A1 | 4/2009 | Saha |
| 2009/0113443 A1 | 4/2009 | Heller |
| 2009/0165006 A1 | 6/2009 | Ceze |
| 2009/0172292 A1 | 7/2009 | Saha |
| 2009/0172303 A1 | 7/2009 | Welc |
| 2009/0172305 A1 | 7/2009 | Shpeisman |
| 2009/0172306 A1 | 7/2009 | Nussbaum |
| 2009/0172654 A1 | 7/2009 | Zhao |
| 2009/0204969 A1 | 8/2009 | Abadi |
| 2009/0235237 A1 | 9/2009 | Song et al. |
| 2009/0235262 A1 | 9/2009 | Ceze et al. |
| 2009/0260011 A1* | 10/2009 | Snover et al. ............ 718/101 |
| 2009/0282386 A1 | 11/2009 | Moir et al. |
| 2010/0131953 A1 | 5/2010 | Dice |
| 2010/0162249 A1 | 6/2010 | Shpeisman |
| 2010/0169382 A1 | 7/2010 | Sheaffer |
| 2010/0169579 A1 | 7/2010 | Sheaffer |
| 2010/0169580 A1 | 7/2010 | Sheaffer |
| 2010/0229043 A1 | 9/2010 | Saha |
| 2010/0325630 A1 | 12/2010 | Flood |
| 2011/0145304 A1 | 6/2011 | Gray |
| 2011/0145498 A1 | 6/2011 | Taillefer |
| 2011/0145553 A1 | 6/2011 | Levanoni |
| 2011/0145802 A1 | 6/2011 | Levanoni |
| 2012/0179877 A1 | 7/2012 | Shriraman et al. |
| 2012/0284485 A1 | 11/2012 | Yamada |

OTHER PUBLICATIONS

Moravan; "Supporting Nested Transactional Memory in LogTM"; Oct. 21-25, 2006; pp. 1-12; http://www.cs.wisc.edu/multifacet/papers/asplos06_nested_logtm.pdf.

Author Unknown; "Extending Hardware Transactional Memory to Support Non-Busy Waiting and Non-Transactional Actions"; 2006; pp. 1-19; http://209.85.229.132/search?q=cache:-9KSLEk_CcIJ:www.cs.purdue.edu/homes/jv/events/TRANSACT/slides/zilles.pdf+non-transactional+instructions+and+abort&cd=3&hl=en&ct=clnk&gl=in.

Carlstrom; "The ATOMOΣ Transactional Programming Language"; Jun. 11-16, 2006; pp. 1-13; http://tcc.stanford.edu/publications/tcc_pldi2006.pdf.

Ananian; "Unbounded Transactional Memory"; 2009; pp. 1-12; http://supertech.csail.mit.edu/papers/xaction.ps.

Shriraman; "Hardware Acceleration of Software Transactional Memory"; Dec. 2005; pp. 1-22; https://urresearch.rochester.edu/retrieve/5518/05.tr887.Hardware_acceleration_of_software_transactional_memory.pdf.

Chaung; "Maintaining Safe Memory for Security, Debugging, and Multi-threading"; 2006; pp. 1-186; http://www.cse.ucsd.edu/Dienst/Respository/2.0/Body/ncstrl.ucsd_cse/CS2006-0873/postscript.

Yen; "LogTM-SE: Decoupling Hardware Transactional Memory from Caches"; Feb. 10-14, 2007; pp. 1-12; http://www.cs.wisc.edu/multifacet/papers/hpca07_logtmse.pdf.

Author Unknown; "CP3SP33 Connectivity Processor with Cache, DSP, and Bluetooth, USB, and Dual CAN Interfaces"; Jul. 2007; pp. 1-346; http://www.national.com/appinfo/cp3000/files/CP3SP33.pdf.

Abadi; "Transactional Memory with Strong Atomicity Using Off-the-Shelf Memory Protection Hardware"; 2009; pp. 1-11; http://research.microsoft.com/en-us/um/people/tharris/papers/2009-ppopp.pdf.

Chong; "Scalable HMM based Inference Engine in LVCSR"; Mar. 31, 2009; 1 page; http://www.icsi.berkeley.edu/cgi-bin/events/event.pl?ID=000531.

Zeichick; "Massive Multi-Core Processors: The Gamer's Edge"; Oct. 4, 2007; pp. 1-2; http://developer.amd.com/documentation/articles/Pages/1042007177.aspx.

Vasantharam; "CSMP"; 2009; pp. 1-3; http://sourceforge.net/projects/mupisoft/.

Bracy; "Disintermediated Active Communication"—Nov. 9, 2006—pp. 1-4—http://ieeexplore.ieee.org/stamp/stamp.jsp?arnumber=04069172.

Shriraman; "Hardware Acceleration of Software Transactional Memory"—Dec. 2005—pp. 1-22—https://urresearch.rochester.edu/retrieve/5518/05.tr887.Hardware_acceleration_of_software_transactional_memory.pdf.

Sondag; "Predictive Thread-to-Core Assignment on a Heterogeneous Multi-Core Processor"—Oct. 18, 2007—pp. 1-5—http://citeseerx.ist.psu.edu/viewdoc/download?doi=10.1.1.90.9734&rep=rep1&type=pdf.

Zhao; "CacheScouts: Fine-Grain Monitoring of Shared Caches in CMP Platforms"—2007—pp. 1-11—http://www.cs.ucr.edu/~zhao/paper/Pact_CacheScout_2007.pdf.

Lilja; "Cache Coherence in Large-Scale Shared Memory Multiprocessors: Issues and Comparisons"—Sep. 1993—pp. 1-43—http://www.arctic.umn.edu/papers/coherence-survey.pdf.

Censier; "A New Solution to Coherence Problems in Multicache Systems"—Dec. 1978—pp. 1-7—http://citeseerx.ist.psu.edu/viewdoc/download?doi=10.1.1.111.7854&rep=rep1&type=pdf.

Papamarcos; "A Low-Overhead Coherence Solution for Multiprocessors with Private Cache Memories"—1984—pp. 348-354—http://www.csl.cornell.edu/courses/ece572/papamarcos.isca84.pdf.

Chuang; "Unbounded Page-Based Transactional Memory"—Oct. 21-25, 2006—pp. 1-12—http://www.cse.ucsd.edu/~wchuang/ASPLOS-06-PTM.pdf.

Swift; "OS Support for Virtualizing Hardware Transactional Memory"—2008—pp. 1-10—http://www.cs.wisc.edu/multifacet/papers/transact08_tvm.pdf.

Singh; "A Metadata Catalog Service for Data Intensive Applications"—Nov. 15-21, 2003—pp. 1-17—http://www.irit.fr/~Jean-Marc.Pierson/DEAGrids/2003-2004/DataandMetaDataManagement/mcs_sc2003.pdf.

Andrew; "A Dictionary of HTML META Tags"—Feb. 11, 2007—pp. 1-11—http://vancouver-webpages.com/META/metatags.detail.html.

Spear; "Implementing and Exploiting Inevitability in Software Transactional Memory"—2008—pp. 59-66—http://ieeexplore.ieee.org/stamp/stamp.jsp?arnumber=04625833.

Author Unknown; Wikipedia; "Software Transactional Memory"—May 7, 2009—pp. 1-7—http://en.wikipedia.org.wiki/Software_transactional_memory.

Moss; "Open Nested Transactions"; Semantics and Support; 2006; pp. 1-8; http://www.cs.utah.edu/wmpi/2006/final-version/wmpi-posters-1-Moss.pdf.

Minh; "An Effective Hybrid Transactional Memory System with Strong Isolation Guarantees"; Jun. 9-13, 2007; pp. 1-12; http://tcc.stanford.edu/publications/tcc_isca2007.pdf.

Office Action dated Oct. 4, 2011 cited in U.S. Appl. No. 12/495,582.

Notice of Allowance dated Nov. 28, 2011 cited in U.S. Appl. No. 12/493,163.

Office Action dated Dec. 12, 2011 cited in U.S. Appl. No. 12/493,165.

Office Action dated Aug. 20, 2012 cited in U.S. Appl. No. 12/638,929.

Office Action dated Aug. 16, 2012 cited in U.S. Appl. No. 12/493,164.

Office Action dated Mar. 29, 2012 cited in U.S. Appl. No. 12/493,168.

Office Action dated Mar. 16, 2012 cited in U.S. Appl. No. 12/493,162.

Notice of Allowance dated Mar. 14, 2012 cited in U.S. Appl. No. 12/495,582.

Notice of Allowance dated Apr. 9, 2012 cited in U.S. Appl. No. 12/493,161.

Curnow—"An Embedded Processor Architecture with Extensive Support for SoC Debug"—Retrieved Jun. 11, 2010; pp. 1-5.

Joao; "Flexible Reference-Counting-Based Hardware Acceleration for Garbage Collection"—Published Jun. 20-24, 2009 pp. 1-11.

Grossman; "The Transactional Memory/Garbage Collection Analogy"—Published Oct. 21-25, 2007—pp. 1-12.

Adl-Tabatabai; "Unlocking Concurrency"—Published Dec./Jan. 2006-2007 pp. 25-33.

Carlstrom; "Executing Java Programs with Transactional Memory"—Published Mar. 26, 2007 pp. 1-32.

Diestelhorst—"Hardware Acceleration for lock-free data structures and software-transactional memory"—Published Aug. 14, 2008 pp. 1-8.

Harizopoulos—"Steps towards cache-resident transaction processing"—Published 2004 pp. 1-12.

Lie—"Hardware Support for Unbounded Transactional Memory"—Published May 7, 2004 pp. 1-111.

Saha—"Architectural Support for Software Transactional Memory"—Published 2006 pp. 1-12.

Volos—"NePaITM: Design and Implementation of Nested Parallelism for Transactional Memory"—Published 2009, pp. 1-25.

Rothermel—"Concurrency Control Issues in Nested Transactions"—Published 1992, pp. 1-36.

Author Unknown—".NET Framework 4 Beta 1 enabled to use Software Transactional Memory (STM.NET Version 1.0)"—Published Jul. 24, 2009; pp. 1-84.

Nyte—"Nesting Models in Software Transactional Memory"—Published Sep. 14, 2007; pp. 1-3.

Agrawal—"Nested parallelism in transactional memory"—Published 2008; pp. 163-174.

Bobba—"Performance Pathologies in Hardware Transactional Memory"—Published 2007; pp. 1-11.

Author Unknown—"Hw-breakpoint: shared debugging registers"—Published Sep. 16, 2009; pp. 1-3.

Scherer—"Contention Management in Dynamic Software Transactional Memory"—Published Apr. 2004; pp. 1-10.

Office Action dated Feb. 3, 2012 cited in U.S. Appl. No. 12/493,164.

Notice of Allowance dated Feb. 21, 2012 cited in U.S. Appl. No. 12/493,161.

Office Action dated Apr. 4, 2012 cited in U.S. Appl. No. 12/638/929.

Notice of Allowance dated Nov. 29, 2012 cited in U.S. Appl. No. 12/638,929.

Harris et al., "Abstract Nested Transactions", Aug. 2007 CiteSeerX, http://citeseer.ist.psu.edu/viewdoc/summary?doi=10.1.1.126.3885, pp. 1-10.

Office Action dated Dec. 7, 2012 cited in U.S. Appl. No. 12/638,103.

Notice of Allowance dated Sep. 13, 2012 cited in U.S. Appl. No. 12/493,168.

Notice of Allowance dated Sep. 24, 2012 cited in U.S. Appl. No. 12/493,165.

Office Action dated Oct. 24, 2012 cited in U.S. Appl. No. 12/493,162.

Office Action dated Jan. 4, 2013 cited in U.S. Appl. No. 12/638,214.

U.S. Appl. No. 13/845,467, filed Mar. 18, 2013, Gray.

U.S. Appl. No. 13/544,558, mailed May 1, 2013, Office Action.

* cited by examiner

| RM | WM | BUF | Data |
|----|----|-----|------|
| 1  | 0  | 0   | pFrom->bal |
|    |    |     |      |
|    |    |     |      |
|    |    |     |      |

FIG. 1B

| RM | WM | BUF | Data |
|----|----|-----|------|
| 1  | 0  | 0   | pFrom->bal |
| 1  | 0  | 0   | amt |
|    |    |     |      |
|    |    |     |      |

FIG. 1C

| RM | WM | BUF | Data |
|----|----|-----|------|
| 1  | 0  | 0   | pFrom->bal |
| 1  | 0  | 0   | amt |
| 0  | 0  | 0   | transfer__attempts |
|    |    |     |      |

FIG. 1D

| RM | WM | BUF | Data |
|---|---|---|---|
| 1 | 0 | 0 | pFrom->bal |
| 1 | 0 | 0 | amt |
| 0 | 0 | 0 | transfer_attempts |
| 1 | 1 | 1 | pTo->bal |

*FIG. 1E*

| RM | WM | BUF | Data |
|---|---|---|---|
| 1 | 1 | 1 | pFrom->bal |
| 1 | 0 | 0 | amt |
| 0 | 0 | 0 | transfer_attempts |
| 1 | 1 | 1 | pTo->bal |

*FIG. 1F*

PERFORMING ESCAPE ACTIONS IN TRANSACTIONS

CROSS-REFERENCE TO RELATED APPLICATIONS

This application is related to U.S. patent application Ser. No. 12/493,165, filed Jun. 26, 2009, and entitled "METAPHYSICALLY ADDRESSED CACHE METADATA", as well as U.S. application Ser. No. 12/493,163, filed Jun. 26, 2009, and entitled "WAIT LOSS SYNCHRONIZATION", as well as U.S. application Ser. No. 12/493,162, filed Jun. 26, 2009, and entitled "FLEXIBLE READ—AND WRITE-MONITORED AND BUFFERED MEMORY BLOCKS", as well as U.S. application Ser. No. 12/493,164, filed Jun. 26, 2009, and entitled "PRIVATE MEMORY REGIONS AND COHERENCE OPTIMIZATIONS", as well as U.S. application Ser. No. 12/493,161, filed Jun. 26, 2009, and entitled "OPERATING SYSTEM VIRTUAL MEMORY MANAGEMENT FOR HARDWARE TRANSACTIONAL MEMORY", as well as U.S. application Ser. No. 12/493,168, filed Jun. 26, 2009, and entitled "MINIMIZING CODE DUPLICATION IN AN UNBOUNDED TRANSACTIONAL MEMORY". All of the foregoing applications are being filed concurrently herewith and are incorporated herein by reference.

The inventions disclosed in this application were developed under a joint research agreement between Microsoft Corporation of Redmond, Washington and Intel Corporation of Santa Clara, Calif.

BACKGROUND

Background and Relevant Art

Computers and computing systems have affected nearly every aspect of modern living. Computers are generally involved in work, recreation, healthcare, transportation, entertainment, household management, etc.

Often computing system implement transactional operations, such as for example, load or store operations, where for a given set of operations, either all of the operations should be performed or none of the operations are performed. For example, a banking system may have operations for crediting and debiting accounts. When operations are performed to exchange money from one account to another, serious problems can occur if the system is allowed to credit one account without debiting another account. However, transactional computing maintains historical information such that operations can be rolled back if all operations in an atomic set of operations cannot be performed. If all of the operations in the atomic set of operations have been performed, then any changes to data stored in memory are committed and become globally observable by other actors for subsequent memory operations. Transactional computing can be implemented, in some systems, using specialized hardware that supports transactional memory. In systems where hardware does not support hardware based transaction computing, transactional computing can be performed by using software techniques.

Operations performed within a transaction typically require additional overhead. For example, memory buffering locations may be required to maintain uncommitted memory stores. Additional monitoring of memory locations accessed within a transaction by an agent may be required to detect conflicting memory accesses by other agents. However, there are often operations performed within a transaction that do not necessarily need the benefits of transactional computing or that need not or should not be rolled back if a transaction aborts. For example, certain logging operations should not be rolled back even if the transaction aborts. Additionally, operations that do not need the benefits of transactional computing, but are nonetheless performed within the context of a transaction may unnecessarily increase the memory access footprint of the transaction.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is a method practiced in a computing environment. The method includes acts for performing hardware based transactions. The method includes at a hardware thread on a processor beginning a hardware based transaction for the thread. Without committing or aborting the transaction, the method further includes suspending the hardware based transaction and performing one or more operations (which may include memory access operations) for the thread, non-transactionally and not affected by transaction monitoring for the transaction, an abort for the transaction, or a commit for the transaction. After performing one or more operations for the thread, non-transactionally, the method further includes resuming the transaction and performing additional operations transactionally. After performing the additional operations, the method further includes either committing or aborting the transaction.

Another embodiment includes a computer processor including an instruction set architecture. The instruction set architecture includes a first processor level instruction configured to begin a hardware based transaction causing operations to be performed transactionally, and where that effects of operations that are performed transactionally are either all committed and made globally observable by other agents or are all aborted and rolled back (e.g. undone, discarded). The instruction set architecture further includes a second processor level instruction configured to exit and commit a hardware based transaction causing the effects of operations performed transactionally to be committed and made globally observable by other agents. The instruction set architecture further includes a third processor level instruction configured to provisionally exit a transaction without committing or aborting the transaction allowing operations to be performed, the effects of which are globally viewable without committing or aborting the transaction in spite of the third processor level instruction being executed after the first processor level instruction and before the second processor level instruction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1B illustrates operations being performed in a cache memory;

FIG. 1C illustrates operations being performed in a cache memory;

FIG. 1D illustrates operations being performed in a cache memory;

FIG. 1E illustrates operations being performed in a cache memory;

FIG. 1F illustrates operations being performed in a cache memory; and

DETAILED DESCRIPTION

Figure 1A:
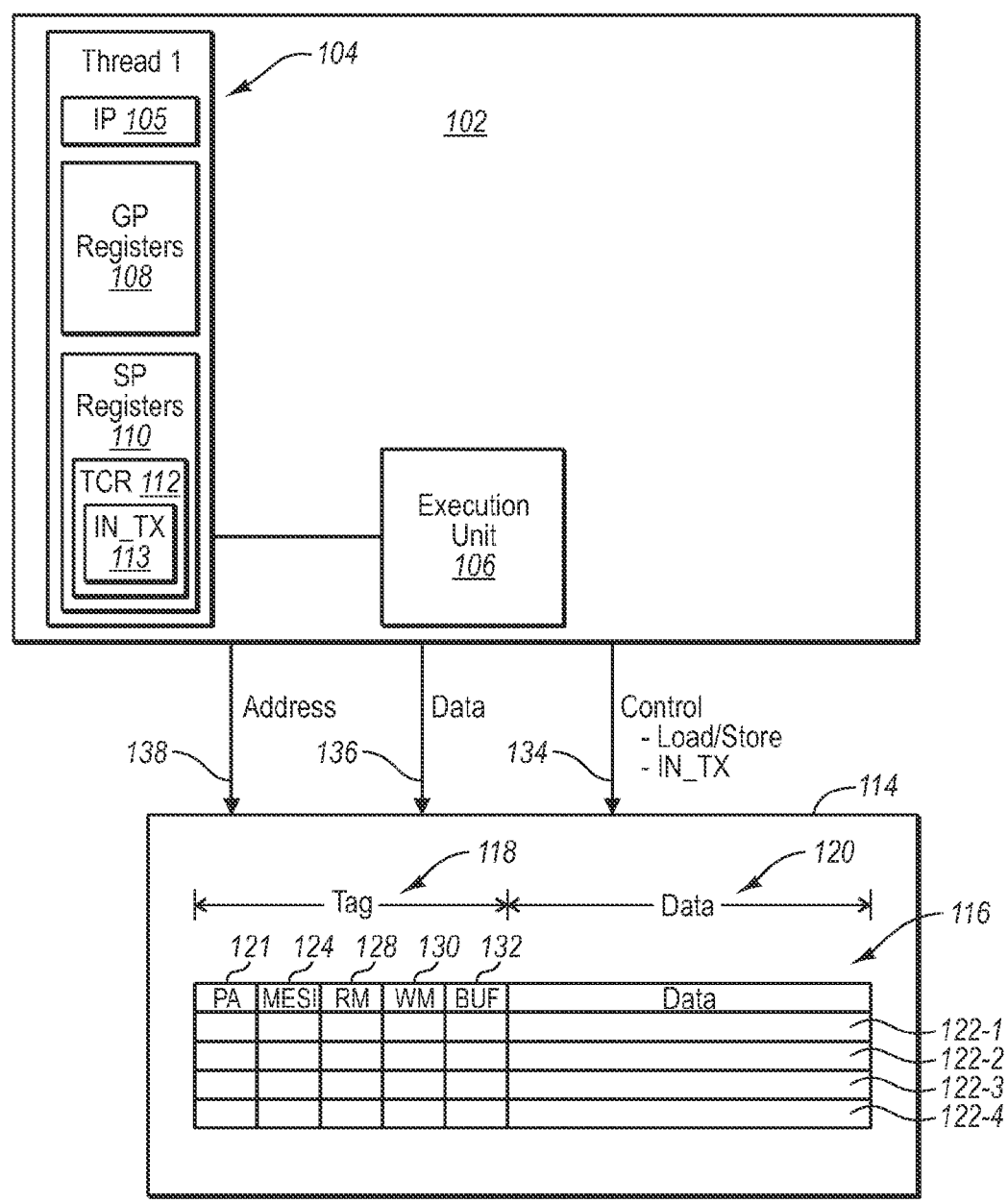
FIG. 1A illustrates a processor and cache memory.

In hardware based transactional memory systems, while inside a scope of a hardware transaction, the hardware thread is typically in a mode in which all memory accesses (loads and/or stores) are automatically and implicitly monitored to ensure that, while the transaction is extant, data read by the thread is not subsequently written by another agent, and data written by the thread is not subsequently read or written by another agent. Further all memory stores are buffered by the hardware and do not become globally observed until the transaction commits, to ensure all of the stores become globally observed at the same time, and to ensure that up to that point, data stores within the transaction can be rolled back if needed. Additionally, while in the scope of a software transaction, hardware may still provide monitoring and/or buffering services. However, it may be desirable to perform some of the memory accesses in a manner that is not monitored for conflicting accesses and/or not buffered. Some embodiments described herein include functionality for performing operations during a transaction, where the operations access memory in a way that is not monitored or buffered.

In other words, operations can be performed for a thread non-transactionally between operations performed by the thread transactionally. Performing operations non-transactionally means that, for those operations, conflict detection monitoring is not established with respect to subsequent memory accesses by other agents. Additionally no buffering of speculative writes is performed, but rather any writes are globally observable.

Some embodiments may perform such unmonitored and un-buffered memory accesses for a number of different reasons. For example, such accesses may be performed as a way to reduce the total footprint of memory accesses within a transaction so that it fits the limited resources that the hardware provides for monitoring and/or buffering. Such accesses may be performed because not all memory accesses need to be transactional. Such accesses may be performed when some variables do not need to be rolled back on a transaction abort, and thus do not need to be buffered. Further still, in some embodiments, it may be desirable to explicitly have some values not rolled back so as to maintain certain information about the transaction whether or not the transaction commits or aborts.

Some embodiments may be implemented to perform some operations in a non-transactional fashion so as not to abort the transaction unnecessarily. For example operations can be performed for collecting statistics or profiling information. Similarly, some embodiments may be implemented to perform certain operations so that even if the transaction aborts, some side effects remain. Some embodiments may be implemented to support embedding a software transaction inside a hardware transaction to support open nesting semantics.

A number of different alternative embodiments may be implemented. For example, embodiments may be implemented by implementing instructions in a processor instruction set architecture to suspend and resume a hardware transaction: When the instruction to suspend the transaction executes, the thread stops monitoring and buffering memory accesses by default and switches to normal operation. After the resume instruction, the thread goes back to the transactional mode with all the parameters of operation as determined at the start of the transaction. In an alternative embodiment, instructions may be implemented in an instruction set architecture to perform explicitly non-transactional memory access while in the scope of a transaction. For example, instructions may be implemented in an instruction set architecture that should not execute transactionally.

FIG. 1A. illustrates transaction capable hardware that may be used to perform transactional computing. FIG. 1A illustrates a processor 102. The processor 102 includes a thread state 104. The thread state 104 includes a number of registers, including an instruction pointer register 105 that points to a memory location of a next instruction to be executed by the thread 104 (and more specifically by the execution unit 106), a set of general purpose registers 108, and a set of special purpose registers 110. In the presently illustrated embodiment, the special purpose registers 110 include a transaction control register 112. The transaction control register 112 includes a number of indicators specifying whether or not operations are being performed within the context of a transaction, and what action should occur when prohibited operations take place within the context of a transaction. For example a transaction control register TCR 112 may have an indicator IN_TX 113 that specifies that operations take place within a transaction and receive transactional memory semantics. Coupled to the processor 102 is a cache memory 114. In this example the cache memory 114 is a level one data cache (L1D$). The cache 114 includes a cache state 116. The cache state 116 is divided into two portions, namely a cache tag portion 118 and a cache data portion 120. The cache state 116 includes a number of cache lines 122.

The tag column 118 typically includes an address column 121 and a MESI column 124. The address column 121 includes a physical address for data stored in the data column 120. In particular, a computing system generally includes system memory. The system memory may be, for example semiconductor based memory, one or more hard-drives and/or flash drives. The system memory has virtual and physical addresses where data is stored. In particular, a physical address identifies some memory location in physical memory, such as system DRAM, whereas a virtual address identifies an absolute address for data. Data may be stored on a hard disk at a virtual address, but will be assigned a physical address when moved into system DRAM.

In the present example, the tag column 118 includes three additional columns, namely a read monitor column (RM) 128, a write monitor column (WM) 130 and a buffer indicator column (BUF) 132. Entries in these columns are typically binary indicators. In particular, a RM entry in the RM column 128 is set on a cache line basis for a particular thread, and indicates whether or not a block of data in the data column 120 should be monitored to determine if the data in the data column 120 is written to by another thread. A WM entry in the WM column 120 is set on a cache line basis for a particular thread, and indicates whether or not the block of data in the data column 120 should be monitored to determine if the data in the data column is read by or written to by another thread. A BUF entry in the BUF column is set on a cache line basis for a particular thread 132, and indicates whether or not data in an entry of the data column 120 is buffered data or if the data is cached data. In particular, the BUF entry can indicate whether a block of data is taken out of cache coherence or not to provide a thread private buffer for speculative writes during a transaction.

Notably, while the RM column 128, the WM column 130, and BUF column 132 are treated as separate columns, it should be appreciated that these indicators could be in fact combined into a single indicator. For example, rather than using one bit for each of the columns, two bits could be used to represent certain combinations of these indicators collectively. In another example, RM column 128, the WM column 130, and BUF column 132 may be represented together with the MESI indicators in the MESI column 124. These seven binary indicators (i.e. M, E, S, I, RM, WM, and BUF) could be represented with fewer bits.

Notably, the indicators in the RM column 128, the WM column 130, and BUF column 132 may be accessible to a programmer using various programming instructions made accessible in a processor's instruction set architecture as will be demonstrated in further detail below.

Illustrating now further functionality of the transaction control register 112 with respect to the cache state 116, if a memory access e.g. a load or store operation is performed while the transaction control register 112 indicates that the thread 104 is within the scope of a transaction (e.g. TCR.IN_TX=1), memory access monitoring state can be represented and indicated in the monitoring entries 128 and/or 130 of a cache line 122. For example, if a load operation is being performed within the context of the transaction, it may be desirable to set a read monitor (e.g. by setting a bit in the RM column 128 for the cache line 122) on the data and on a cache line used to perform the load operation. The read monitor indicates that no other agents should write to the read monitored cache line. In another example, if a store operation is being performed within the context of a transaction, a write monitor and a buffer indication may be placed in the monitor and buffer entries 130 and 132 respectively of a cache line 122. The write monitor indicates that other agents should not read or write to the monitored cache line 122. The buffer indicator indicates that the cache is buffered and that the buffered block of data is not globally observed by other agents. This allows the cache line 122 to be used as a temporary storage location for performing operations and/or for storing data that must be rolled back in the event that a transaction is aborted.

In the following examples, suppose that a transaction is implemented to accomplish the account transfer described above whereby funds are transferred from a first account to a second account. This requires debiting the first account a given amount of money and crediting the second account the same amount of money. If both of these operations cannot be performed, then neither should be performed, otherwise money will disappear or appear with respect to the overall system. Additionally suppose that it is desirable to log the number of attempts made to perform the entire transaction. However, the number of attempts should not be rolled back if the transaction fails as it may be desirable to maintain this information for logging purposes.

A first example is now illustrated of an embodiment that implements three related instructions in an instruction set architecture which allows for beginning, suspending, resuming and ending a transaction. In the example illustrated a begin transaction instruction is represented as TB and an exit transaction instruction is represented for example purposes as TX. The begin transaction instruction can be used to start a transaction and to resume a transaction after it has been suspended. The exit transaction instruction can be used to suspend a transaction without necessarily aborting it. A transaction exit and commit instruction, illustrated herein as TXCOM, can be used to exit a transaction and to commit the transaction such that all of the transactional data becomes globally observable. In particular, read and write monitors and buffering are removed (or in some embodiments, deasserted) from the entries 128, 130 and 132 of the cache lines. The following represents source code and corresponding compiled assembly code that may be used to accomplish the money transfer and "number of attempts" logging.

```
// C source with atomic blocks:
int transfer_attempts = 0;
void transfer(Account* pFrom, Account* pTo, int amt) {
    atomic {
        if(pFrom->bal - amt < 0) { /* handle overdraft */ }
        atomic_escape { ++transfer_attempts; }
        pTo->bal += amt;
        pFrom->bal -= amt;
    }
}
```

| | ; equivalent assembly code | ; comments: |
|---|---|---|
| | _transfer: | ; pFrom=edx pTo=ecx amt=8[bp] |
| 1. | | |
| 2. | mov eax, bal[pFrom] | ; pFrom->bal |
| 3. | sub eax, amt | ; – amt |
| 4. | jlt overdraft | ; < 0 ? jump to overdraft |
| 5. | TX | ; escape transaction |
| 6. | inc transfer_attempts | ; increment transfer_attempts |
| 7. | TB | ; resume transaction |
| 8. | mov eax, amt | |
| 9. | add bal[pTo], eax | ; pTo->bal += amt; |
| 10. | sub bal[pFrom], eax | ; pFrom->bal -= amt; |
| 11. | TXCOM | ; try to commit the transaction |

The preceding code will now be explained with reference to FIGS. 1A-1E. Line 1 of the above code includes a begin transaction instruction TB. This instruction indicates that operations performed after the instruction should be performed within the context of the transaction and should receive transactional memory semantics. Thus, any loads or stores in to the cache 114 will have appropriate read or write monitors placed on the corresponding cache line 122. In one embodiment, the begin transaction instruction may be accomplished by setting an indicator in the transaction control register 112 that indicates that the thread 104 is in a transaction. For example, it may set TCR._IN_TX 113.

Lines 2-4 of the above code illustrate a number of instructions used to determine if sufficient funds are available in the 'from' first account to transfer a given amount designated by the variable "amt" to a second 'to' account. The instruction at line 2 moves into a register cax of the general-purpose registers 108 an account balance value for the first account. This instruction causes a load operation to be performed within the context of the transaction. Thus, as illustrated by FIG. 1B. a cache line 122-1 storing the value of the balance of the first account has a read monitor placed on it as illustrated at 128-1.

Line 3 of the above code performs a mathematical operation by loading and subtracting the amount to transfer from the balance in the first account. The load of amt is performed transactionally, and as illustrated in FIG. 1C at cache line 122-2, a read monitor is set in the monitor entry 128-2 for the cache line 122-2. The instruction at line 4 determines, based on the subtraction, if an overdraft condition would be caused by transferring the amount from the first account. In particular, a jump less than instruction is executed to determine if an overdraft condition would be caused by transferring the amount from the first account, causing a jump to a label "overdraft". Although not illustrated here, instructions at overdraft may abort the transaction, causing a release of the any monitoring and buffering.

If an overdraft condition would not occur due to transferring the amount from the first account, then the transaction exit instruction illustrated at line 5 would be performed. The transaction exit instruction illustrated at line 5 causes the transaction control register 112 to indicate that subsequent instructions should not be performed transactionally. For example, it may reset TCR.IN_TX 113. As illustrated in the example, the instruction following the transaction exit instruction illustrated at line 5 implements a counter which keeps track of the number of transfer attempts, by incrementing a variable transfer attempts, that have been performed. It may be desirable to maintain a count of the number of attempts to perform a transfer for logging or other purposes. FIG. 1D illustrates the state of the cache state 116 as a result of performing the transaction exit instruction illustrated that line 5 and the increment transfer attempts instruction indicated at line 6. In particular, for the cache line 122-3, the variable transfer attempts is stored. However, examination of the monitor and buffering entries 128-3, 130-3, and 132-3 indicates that because the increment instruction is executed non transactionally, no monitoring or buffering is established on the cache line 122-3 storing the transfer attempts variable.

At line 7, the transaction begin instruction is executed causing instructions that follow to once again be executed transactionally. Line 8 illustrates an instruction that causes a load operation to be performed on a variable amt representing the amount to be transferred between the first and second accounts. The load operation is performed transactionally, but the variable amt has already been cached and read monitored due to the read access on line 3 so no additional change to the cache state is likely required.

Line 9 of the code above illustrates an add operation performed whereby the amount is added to the balance of the second account. The add operation performs a number of load and store operations which are performed transactionally which results in read and write monitoring and buffering being placed on the cache line 122-4 at the entries 128-4, 130-4, and 132-4 respectively as illustrated in FIG. 1E.

The instruction at line 10 of the above code causes the amount to be subtracted from the first account. This subtraction operation performs a number of load and store operations. Because these operations are performed transactionally, and as illustrated at FIG. 1F, read and write monitoring and buffering are placed on the cache line 122-6 storing the balance for the second account as illustrated by the entries 128-1, 130-1, and 132-1 respectively.

At line 11 of the instructions illustrated above, a transaction exit and commit instruction TXCOM is executed which may causes all of the thread's read and write monitors and buffers in the monitor entries so that the cache lines 122 are globally observable such that reads and writes from all agents can take place in accordance with normal shared memory semantics via normal cache coherence operations.

Similar functionality can be performed using a class of instructions that explicitly specify operations to be performed non-transactionally even though hardware may be in a transaction mode. Operations performed as a result of executing instructions that require explicitly non transactional stores will write their data so that it is globally observable immediately. They may perform that data write "around and over" the buffered line—updating it in the process, or they may invalidate and discard the buffered line in the process, effectively aborting the transaction. The write "around and over" option allows software to perform globally observable stores without having to make sure that no non-transactional data overlaps with a line of buffered data. In another embodiment, an explicitly unbuffered store to data that falls on a buffered line also invalidates the buffering. Software should be able to avoid accidentally overlapping non-transactional data with lines of buffered data.

The following assembly code illustrates an example whereby instructions which explicitly specify that operations should not be performed transactionally, irrespective of a hardware mode, is now illustrated.

```
     ; alternative assembly code for transfer( ) function shown above,
     using movxu_transfer:          ; pFrom=edx pTo=ecx amt=8[bp]
 1.  TB                              ; begin hardware transaction
 2.       mov eax, bal[pFrom]        ; pFrom->bal
 3.       sub eax, amt               ;  - amt
 4.       jlt overdraft              ; < 0 ? jump to overdraft
 5.       movxu eax, transfer_attempts ; explicitly unmonitored load
 6.       inc eax                    ; ++transfer_attempts
 7.       movxu transfer_attempts, eax ; explicitly unmonitored store
 8.       mov eax, amt
 9.       add bal[pTo], eax          ; pTo->bal += amt;
10.       sub bal[pFrom], eax        ; pFrom->bal -= amt;
11.  TXCOM                           ; try to commit the transaction
```

Execution of these instructions will result in similar results to the example illustrated previously. For example, execution of the instruction in line 2 result in a cache state similar to that illustrated in FIG. 1B. Lines 5-7 illustrate instructions where move operations are performed in explicitly non-transactional ways such that no read or write monitors or buffering is set on the cache line 122-2, which accesses the transfer attempts variable as illustrated in FIG. 1C. Execution of the instructions illustrated at lines 9 and 10 are performed transactionally because the specialized instructions indicating that an operation should not be performed transactionally are not used, and the hardware is in a transaction mode. Execution of the instructions at lines 9 and 10 result in the states of the cache state 116 illustrated in FIGS. 1D and 1E respectively.

Some embodiments may find particular usefulness when there is a desire to perfoini operations outside of a given abstraction level. In particular, computing systems can be abstracted to different abstraction levels. For example, a lowest abstraction level may be a hardware level. Above the hardware level may be an operating system level. Above the operating system level may be a virtual machine or common language runtime level. Above the virtual machine or common language runtime level is a runtime library level. Above the runtime library is an application library level. Above the application library level is an application level. While it may be desirable to perform operation transactionally while performing application level operations, it may be beneficial to perform operations below the application abstraction level non-transactionally. Thus, a thread can be taken out of transactional computing to perform operations below the application level. This can be accomplished in some embodiments by using the instructions illustrated previously herein, including instructions to exit a transaction (TX) or instructions to explicitly perform operations non-transactionally (e.g. movxu illustrated above).

For example, software systems often use a memory allocator to dynamically allocate and deallocate blocks of memory. A call to a malloc function can be used to request a block of memory. The memory allocation heap, being a globally shared resource, may be in high demand, and many threads, some in transactions, may call malloc at approximately the same time. However, a call to a malloc function may be needed while a thread is running application code while the hardware is in a transactional memory mode (e.g. TCRIN_TX 113 is asserted). Using features of some embodiments described herein, the software can issue an instruction that when executed by a thread and/or processor causes the hardware to execute instructions that follow non-transactionally (such as by causing TCR.IN_TX 113 to be deasserted while the instructions are executed). Thus, the malloc call can be made non-transactionally and the allocation heap memory locations it happens to access as it searches for a suitable block of memory to return do not implicitly become transactionally monitored or buffered by this thread, as desired. After the malloc call, the software can issue an instruction that when executed by the hardware, causes the hardware to re-enter implicit hardware transactional states (e.g. by asserting TCR.INTX).

Embodiments allow for performing escape actions inside transactions in a very efficient manner. When few escape actions are needed, non-transactional instructions (e.g. variants of movxu illustrated above) can be used. When a large and complex escape action is needed, software may suspend and resume a transaction using processor instructions (e.g. variants of TB and TX illustrated above).

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Figure 2:
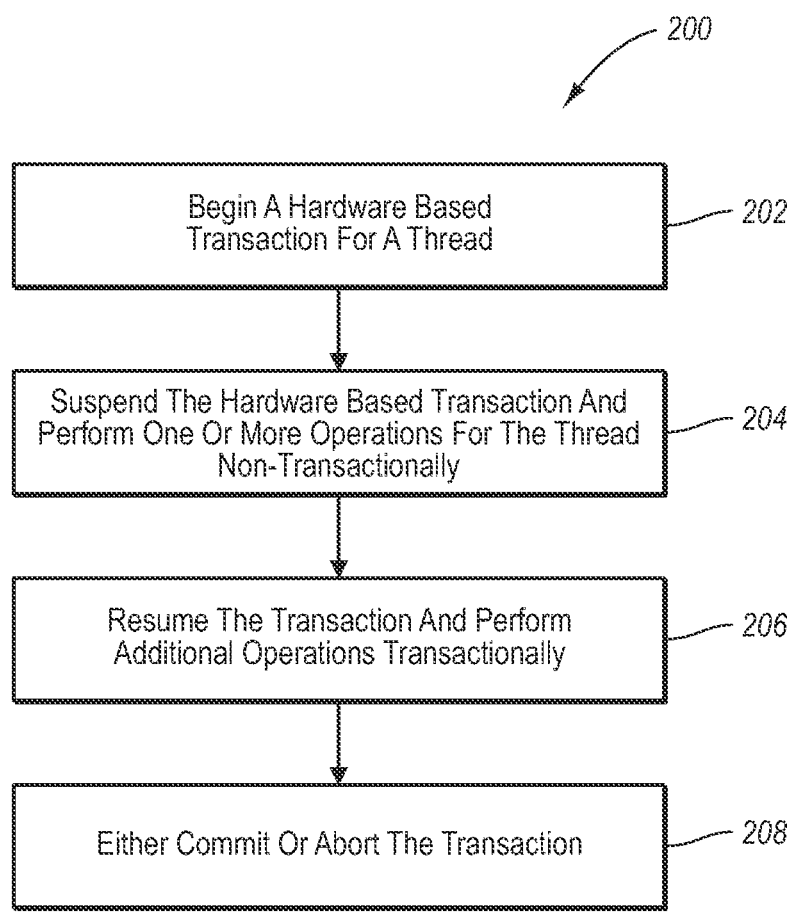
FIG. 2 illustrates a method of performing transactions.

Referring now to FIG. 2, a method 200 is illustrated. The method may be practiced in a computing environment, and includes acts for performing a hardware based transaction. The method includes, at a hardware thread on a processor beginning a hardware based transaction for a thread (act 202). This may be facilitated for example by executing a processor level instruction implemented in an instruction set architecture. The processor level instruction may be configured to set a thread mode control indicator indicating that the thread is in a transaction. For example, in FIG. 1A, execution of a processor level instruction by the thread 104 may cause an "in transaction" indicator to be set in the transaction control register 112 (for example TCR.IN_TX 113).

Without committing or aborting the transaction, the method 200 further includes suspending the hardware based transaction and performing one or more operations for the thread, non-transactionally (act 204). These operations are not affected by: transaction monitoring for the transaction, an abort for the transaction, or a commit for the transaction. In particular, the results of these operations may be immediately and globally observable by other agents in the system.

The method 200 may be performed where suspending the hardware based transaction and performing one or more operations for the thread, non-transactionally includes executing a specialized instruction, included in an instruction set architecture for the processor, configured to cause a thread to perform operations out of a transaction. For example, in one embodiment, executing the specialized instruction causes instructions executed after the execution of the specialized instruction to perform operations non-transactionally until an act of resuming the transaction is performed. Examples above illustrating the use of the TX instruction illustrate one example embodiment. In particular, instructions executed after the TX instruction perform operations non-transactionally until another TB instruction is executed, thereby resuming the transaction. In an alternative embodiment, executing the specialized instruction causes a single load or store operation to be performed explicitly non-transactionally. As illustrated above, the movxu instruction causes a load or store to be performed that is explicitly non-transactional even when a thread is in an in-transaction status.

In some embodiments, the specialized instruction to suspend a transaction is configured to deassert a thread mode control indicator so as to indicate that the thread is not in a transaction. For example, specialized instructions that suspend a transaction may de-assert an indicator in the transaction control register 112.

The method 200 may be performed where suspending the hardware based transaction and performing one or more operations for the thread, non-transactionally includes deasserting an indicator in a hardware thread which indicates that operations are to be performed transactionally. For example, an indicator may be placed on the control line 134 illustrated in FIG. 1A. The indicator may accompany memory load and store operations when being operated on by a thread. Further, the indicator may be available to a cache such that the cache can turn on or off establishment of cache-based memory access conflict monitoring as part of the hardware transaction. For example, as illustrated in FIG. 1A, a load or store operation performed by a thread typically includes the thread identifying an address to a cache 114 on an address bus 138 at which data should be loaded from or stored to, data either being received from a cache 114 or sent to a cache 114 on a data bus 136, and control signals sent to a cache 114 on a control bus 134 indicating whether an operation is a load or a store operation. Additionally, a signal indicating if the operation is performed transactionally or not can be included in the control signals. This information can be used by the cache to determine if read or write monitoring and/or buffering should be set on a cache line 122 for a given operation. If monitoring or buffering should be set, appropriate entries in a monitor or buffer entry for a cache line can be made.

In particular, in one embodiment, a thread or processor may execute instructions in an out-of-order pipelined implementation. In such implementations, instructions appear to software to be executed sequentially even when not executed sequentially as corresponding microarchitectural instructions at the microarchitectural level. As such transactionally executed instructions although appearing to be executed sequentially, may actually be executed in a sequence with intermingled non-transactionally executed instructions. To ensure that instructions are executed transactionally or non-transactionally as appropriate, at the microarchitectural level the transactionally executed corresponding microarchitectural instructions each carry an accompanying in transaction indicator indicating that the corresponding microarchitectural instructions are to be executed transactionally or non-transactionally regardless of the order that the corresponding microarchitectural instructions are actually performed at the microarchitectural level. This facilitates arbitrary out of order execution mixes of transactionally executed and non-transactionally executed corresponding microarchitectural instructions at the microarchitectural level.

After performing one or more operations for the thread, non-transactionally, the method 200 further includes resuming the transaction and performing additional operations transactionally (act 206). For example, in one embodiment, resuming the transaction includes executing a processor level instruction implemented in an instruction set architecture. The processor level instruction may be configured to assert an indicator indicating that the thread is in a transaction. For example, the processor level instruction may assert an indicator in the transaction control register.

After performing the additional operations, the method 200 further includes either committing or aborting the transaction (act 208). Committing the transaction causes the effects of operations performed transactionally to become globally observable, such as by making appropriate MESI state transitions on monitored or buffered cache lines, and removing monitoring and/or buffering states in the cache. Aborting the transaction causes any effects of operations performed transactionally, for example transactionally written data, to be rolled back before being made globally observable again.

The method 200 may be performed where committing the transaction comprises executing a processor level instruction implemented in an instruction set architecture where the processor level instruction configured to deassert an indicator indicating that the thread is in a transaction and to make the effects of operations performed transactionally globally observable. An example of such an instruction is illustrated above in examples illustrating the TXCOM instruction.

Suspending the transaction may be performed for a number of different purposes. For example, in one embodiment, the method 200 may be performed where suspending the hardware based transaction and performing one or more operations for the thread, non-transactionally is performed for operations that are performed in an abstraction layer below an abstraction layer including a programming module. For example, when performing operations at a hardware layer, operating system layer, virtual machine layer, etc. it may be desirable to perform the operations non-transactionally. In another embodiment, the method 200 may be performed where suspending the hardware based transaction and performing one or more operations for the thread, non-transactionally is performed to minimize the footprint (total size) of monitored or buffered cache state used within a cache based hardware transaction by not including non-shared data and/or non-speculatively written data in transactional monitoring or buffering.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of performing hardware based transactions, the method comprising:
   at a hardware thread on a processor beginning a hardware based transaction for the thread;
   without committing or aborting the transaction, suspending the hardware based transaction and performing one or more operations for the thread, non-transactionally and not affected by: transaction monitoring for the transaction, an abort for the transaction, or a commit for the transaction, wherein performing one or more operations for the thread comprises incrementing a count of a counter indicating a number of times a set of transactional instructions have been attempted without regard to whether the effects of the set of transactional instructions were eventually successful in that the effects were committed;
   after performing one or more operations for the thread, non-transactionally, resuming the transaction and performing additional operations transactionally; and
   after performing the additional operations, aborting the transaction while maintaining the count in the counter such that the count in the counter keeps track of the number of attempts to execute the set of transactional instructions whether the set of transactional instructions were successful or not.

2. The method of claim 1, wherein beginning the transaction comprises executing a processor level instruction implemented in an instruction set architecture, the processor level instruction configured to assert an indicator indicating that the hardware thread on a processor is in a transaction.

3. The method of claim 1, wherein resuming the transaction comprises executing a processor level instruction implemented in an instruction set architecture, the processor level instruction configured to assert an indicator indicating that the hardware thread on a processor is in a transaction.

4. The method of claim 1, wherein suspending the hardware based transaction and performing one or more operations for the thread, non-transactionally comprises executing a specialized instruction, included in an instruction set architecture for the processor, configured to cause a hardware thread on a processor to perform operations out of a transaction.

5. The method of claim 4, wherein executing the specialized instruction causes instructions executed after the execution of the specialized instruction to perform operations non-transactionally until the act of resuming the transaction is performed.

6. The method of claim 4, wherein executing the specialized instruction causes a load or store operation to be performed explicitly non-transactionally.

7. The method of claim 5, wherein the specialized instruction is configured to deassert an indicator so as to indicate that the hardware thread on a processor is not in a transaction.

8. The method of claim 1, wherein suspending the hardware based transaction and performing one or more operations for the thread, non-transactionally comprises asserting an indicator in a hardware thread which indicates that operations are not performed transactionally.

9. The method of claim 8, wherein the indicator accompanies memory load and store operations when being operated on by a hardware thread on a processor and wherein the indicator is available to a cache such that the cache can enable or disable establishment of cache based transactional access conflict monitoring and buffering states as part of the hardware transaction.

10. The method of claim 1, wherein suspending the hardware based transaction and performing one or more operations for the thread, non-transactionally is performed for operations that are performed in a software abstraction layer below another software abstraction layer that is performing operations using implicit hardware transactional memory wherein implicit hardware transactional memory automatically monitors memory accesses.

11. The method of claim 1, wherein suspending the hardware based transaction and performing one or more operations for the thread, non-transactionally is performed to minimize a cache memory footprint by not including non-shared data accesses in transactional monitoring and buffering.

12. In a computing environment, a method of performing hardware based transactions, the method comprising:
   at a hardware thread on a processor executing a first processor level instruction to begin a hardware based transaction for the thread causing operations to be performed transactionally, and where that effects of operations that are performed transactionally are either all committed and made globally observable by other agents or are all aborted and rolled back;
   without committing or aborting the transaction, executing a second processor level instruction to provisionally exit a transaction without committing or aborting the transaction allowing operations to be performed, the effects of which are globally observable without committing or aborting the transaction;
   after executing the second processor level instruction, performing one or more operations for the thread, non-transactionally and not affected by: transaction monitoring for the transaction, an abort for the transaction, or a commit for the transaction, wherein performing one or more operations for the thread comprises incrementing a count of a counter indicating the number of times a set of transactional instructions have been attempted without regard to whether the effects of the set of transactional instructions were eventually successful in that the effects were committed;
   after performing one or more operations for the thread, non-transactionally, executing the first processor level instruction again thereby resuming the transaction;
   after executing the first processor level instruction again performing additional operations transactionally; and
   after performing the additional operations, aborting the transaction while maintaining the count in the counter such that the count in the counter keeps track of the number of attempts to execute the set of transaction instructions whether the set of transactional instructions were successful or not.

13. In a computing environment, a system for performing hardware based transactions, the system comprising:
   one or more processors; and
   one or more computer readable media, wherein the one or more computer readable media comprise computer executable instructions that when executed by at least one of the one or more processors cause at least one of the one or more processors to perform the following:
   at a hardware thread on a processor beginning a hardware based transaction for the thread;
   without committing or aborting the transaction, suspending the hardware based transaction and performing one or more operations for the thread, non-transactionally and not affected by: transaction monitoring for the transaction, an abort for the transaction, or a commit for the transaction, wherein performing one or more operations for the thread comprises incrementing a count of a counter indicating the number of times a set of transactional instructions have been attempted without regard to whether the effects of the set of transactional instructions were eventually successful in that the effects were committed;

after performing one or more operations for the thread, non-transactionally, resuming the transaction and performing additional operations transactionally; and after performing the additional operations, aborting the transaction while maintaining the count in the counter such that the count in the counter keeps track of the number of attempts to execute the set of transaction instructions whether the set of transactional instructions were successful or not.

14. The system of claim 13, wherein beginning the transaction comprises executing a processor level instruction implemented in an instruction set architecture, the processor level instruction configured to assert an indicator indicating that the hardware thread on a processor is in a transaction.

15. The system of claim 13, wherein resuming the transaction comprises executing a processor level instruction implemented in an instruction set architecture, the processor level instruction configured to assert an indicator indicating that the hardware thread on a processor is in a transaction.

16. The system of claim 13, wherein suspending the hardware based transaction and performing one or more operations for the thread, non-transactionally comprises executing a specialized instruction, included in an instruction set architecture for the processor, configured to cause a hardware thread on a processor to perform operations out of a transaction.

17. The system of claim 16, wherein executing the specialized instruction causes instructions executed after the execution of the specialized instruction to perform operations non-transactionally until the act of resuming the transaction is performed.

18. The system of claim 13, wherein suspending the hardware based transaction and performing one or more operations for the thread, non-transactionally comprises asserting an indicator in a hardware thread which indicates that operations are not performed transactionally.

19. The system of claim 18, wherein the indicator accompanies memory load and store operations when being operated on by a hardware thread on a processor and wherein the indicator is available to a cache such that the cache can enable or disable establishment of cache based transactional access conflict monitoring and buffering states as part of the hardware transaction.

20. The system of claim 13, wherein suspending the hardware based transaction and performing one or more operations for the thread, non-transactionally is performed for operations that are performed in a software abstraction layer below another software abstraction layer that is performing operations using implicit hardware transactional memory wherein implicit hardware transactional memory automatically monitors memory accesses.

* * * * *